Patented Dec. 23, 1941

2,267,624

UNITED STATES PATENT OFFICE 2,267,624

CHOCOLATE-FLAVOR DRINK AND PROCESS OF PRODUCING SAME

Arthur Edward Siehrs, Chicago, Ill., assignor to Krim-Ko Company, Chicago, Ill., a corporation of Illinois No Drawing. Application November 9, 1938, Serial No. 239,600

20 Claims. (Cl. 99—25)

This invention relates to an improved chocolate or cocoa flavor drink which is characterized as comprising a predetermined quantity of chocolate maintained in suspension in a suitable liquid medium by means of a mucilaginous extract from quince seeds which serves as a suspending agent.

This invention also relates to the process of producing the chocolate-flavor drink herein disclosed.

It is an object of this invention to provide a chocolate-flavor drink in any suitable liquid medium, such as milk, water or the like, in which the chocolate particles are maintained in suspension without danger of settling out under a larger variety of conditions than has been possible prior to this invention.

It is a further object to provide a chocolate-flavor drink by the suspension of chocolate particles in water or milk, or other suspension medium.

It is a further object of this invention to provide a chocolate-flavor drink which may be carbonated and which has good keeping qualities and is not subject to separation of the chocolate particles from the liquid medium.

It is a further object of this invention to provide a chocolate-flavor drink in which the chocolate particles may be suspended in a suitable liquid medium while the medium is cold and without requiring heating, and in which the suspension medium will have substantially the same effect in maintaining the chocolate particles in suspension when the liquid is hot as when it is cold. The accomplishment of this object renders unnecessary the agitation of the product which would otherwise be required during the pasteurization or sterilization thereof.

It is a further object of this invention to provide a chocolate-flavor drink which employs a mucilaginous extract of quince seed as the suspending agent, either alone or with other agents.

It is a further object of this invention to provide a chocolate-flavor milk drink which has substantially the same apparent physical characteristics when it is hot as when it is cold.

It is a further object of this invention to provide a chocolate-flavor drink in which the quantity of suspension agent required for maintaining the chocolate in suspension is not materially altered by the temperature of the product.

It is a further object of this invention to provide a chocolate-flavor drink in which the chocolate particles are maintained in liquid suspension by a suspension agent which does not materially thicken the product, irrespective of the temperature of the product.

It is a further object of this invention to provide a chocolate-flavor drink which may be made with milk, and when so made the milk employed is not subject to the danger of undergoing change or being affected in any appreciable way by the suspending agent serving to hold the chocolate particles in suspension.

It is a further object of this invention to provide a drink of the character referred to, which employs a suspending agent which is free from objectionable odor and flavor.

These and other objects not specifically enumerated are contemplated for this invention, as will readily appear to one skilled in the art as the following description proceeds.

In the manufacture of chocolate-flavor drinks, it has been customary to employ milk as the liquid medium and to utilize one or more of a number of suspending agents, such as starch, gelatin or the like, which have given varying degrees of success, according to the particular agent or agents employed. At all times, however, the use of such agents has had a material effect upon the apparent physical properties of the product and have caused an appreciable thickening thereof, which in many instances is undesirable. Various suspending agents which might otherwise be satisfactory must be used in such proportion to maintain the chocolate particles in suspension as to render the product unfit for commercial use because of the high degree of thickening that results from such use. Furthermore, as far as the applicant is aware, all agents used in connection with chocolate-flavor milk drinks have apparently relied in some degree upon the presence of certain of the ingredients of milk because they have been utilized with some degree of success when employed with milk, whereas satisfactory drinks could not be produced therewith when water is employed as the liquid medium instead of milk. Furthermore, as far as the applicant is aware, most of such agents have required some degree of heat to cause the agent to pass into solution or suspension and have exhibited a different effect when the product is hot than when it is cold, always requiring more of the agent to maintain the suspension at the elevated temperature.

The applicant has now discovered a new and improved agent which behaves peculiarly as a suspension agent for chocolate particles in the production of chocolate-flavor drinks which may be formed with water as the liquid medium, or with milk, or any other suitable liquid medium.

The agent of this invention is a mucilaginous extract from quince seeds, and it is found that this agent exhibits a very important and desirable effect in maintaining the colloidal suspension of the chocolate particles in the drinks here referred to. This mucilaginous extract is technically a mucilage and not a pectin. It is known that quinces contain some pectin, and whereas some unimportant portion of pectin may be extracted with the mucilage employed in this invention, it is to be understood that the agent here referred to is the mucilage of quince seeds rather than of the pectin of quince, irrespective of whether or not some small quantity of pectin may be present. This extract is free from objectionable odor and flavor and, accordingly, it does not require any special deodorizing treatment. Whereas it is not completely odorless and tasteless, nevertheless its odor and flavor are not very great, and such as it is, it resembles the odor and flavor of quince which is relatively pleasant and is not in the slightest degree objectionable for use in drinks of the character here referred to. Of course, this extract could be purified and thereby rendered odorless and tasteless, but for ordinary usage the expense of such additional treatment is not considered necessary.

This material may be obtained substantially as follows: First, the dry seeds are placed in water in proportion of approximately 5 parts of dried seeds to 100 parts of water. In commercial practice it has been found well to obtain such mucilaginous extract by placing 300 gallons of water in a 600 gallon tank and adding thereto 5 parts by weight, based on the quantity of water, of dried quince seeds. These seeds are small dark seeds resembling somewhat the seeds of apples. The batch of seeds and water is then agitated while being heated for a period of approximately 4 to 5 hours. It is preferable, though not necessary, to maintain temperature of approximately 140 to 150° F. This particular temperature is not critical because the temperature may be somewhat higher and, if so, a larger extraction or yield is obtained. However, with such higher yield, the color is darkened and a larger percentage of unwanted impurities are also extracted. If the temperature is somewhat lower, a purer product is obtained but the yield is somewhat reduced. Accordingly, the temperature mentioned is preferred as a satisfactory balance between yield and purity and color.

During the heating and agitation above referred to, the mass becomes quite thick even when hot because, as a matter of fact, this particular extract has substantially the same viscosity whether hot or cold.

After the extraction has been effected as above described, the mucilage and seeds are screened under suction whereby the mucilage and seeds are separated. This mucilage could be used in this form if desired. It is preferred, however, to further process this extract to produce a powder, which is the form in which it is preferably used in making the chocolate drink hereinafter referred to.

Any desired procedure for obtaining the mucilaginous extract in dry powdered form may be employed, and this invention is not to be limited to powdered extracts obtained by any particular method. However, as one illustrated procedure, the mucilage may first be treated to precipitate the active material therein. This may be done by taking approximately 350 gallons of the mucilage and adding thereto an equal volume of a suitable alcohol, such as, for instance, isopropyl alcohol. The presence of the alcohol precipitates the active material out in the form of a stringy, film-like material of a slightly grayish color. After precipitation has been effected, the liquid is filtered off and the alcohol recovered therefrom for use over again. The residual precipitate is in the form of a grayish, doughy mass which next is dried to form a brittle grindable material. Drying can be effected by air drying, heat drying, or by water extraction produced by the presence of alcohol. In this latter case, alcohol, such as isopropyl alcohol, is placed over the mass in quantity sufficient to cover the same, and left over night. Finally, the dried mass produced by any of the above drying operations is ground in a suitable mill, such as a hammer mill or a roller or ball mill. The resulting product is a light grayish powder which is utilized as the suspending agent hereinafter referred to in the following description relating to the production of chocolate drinks.

It is to be understood that the term "mucilaginous extract of quince seeds" as hereinafter referred to is intended to mean the extract utilized in either the liquid or the dry form, or any other form which will give the desired results coming within the scope of the teachings of this invention.

By way of example, various chocolate-flavor drink products may be made with the mucilaginous agent above referred to, certain examples of which will now be given. The proportions used in the following examples are not to be construed as definite or fixed because there exists a rather wide variation in strength of natural products and because of the fact that different concentrates of the same mucilaginous extract may be necessary for use in different types of manufacturing equipment. In addition, when milk is employed, variations in the milk, such as the acidity, fat, total solids, age of the milk, or the type of products suspended will require differences in the quantity and concentration of the mucilaginous extract employed.

*Example No. 1*

One specific example contemplated by this invention relates to the production of a syrup, such as a chocolate syrup, which may be mixed hot or cold with milk or other liquid medium in proportion ranging from 1 part syrup to from 8 to 11 parts, more or less, of the milk or other medium. One such formula is as follows:

| | Parts by weight |
|---|---|
| Cocoa | 10 |
| Sugar | 55 |
| Quince seed mucilage | .3 to 1 |
| Flavoring | To taste |
| Water | 34½ to 35 |

One of the methods for preparing the syrup is as follows: 55 parts of sugar and 15 parts of water are heated to boiling and the sugar inverted by means of tartaric acid, cooled to 180°, and cocoa stirred in. At the same time, the quince seed mucilage is dissolved by stirring in 20 parts of water and the mixture is then heated to approximately 165° F. Both the sugar and the quince seed mucilage are held at their respective temperatures for sufficient time to allow thorough mixing and solution—usually from 10 to 30 minutes—and then the quince seed mucilage is added to the cocoa-sugar solution and stirred until well mixed. The product is cooled and flavoring added after it is cooled.

This syrup may then be mixed with milk in proportion from 1 part to from 8 to 13 parts of milk, depending on various factors, although usually 1 to 10 parts is preferred. This may be done either by mixing the syrup thoroughly with the cold milk and bottling, or heating the milk to practically any temperature desired before adding to the syrup, such as, for instance, to 145° F. for 30 minutes. Thereafter, the mixture is cooled and bottled. This finished product will show a uniform distribution throughout the bottle and will not show cocoa settling on the bottom.

*Example No. 2*

This example relates to the use of the syrup disclosed and utilized in connection with Example No. 1 for the production of a drink by adding the same to the desired quantity of water instead of milk. The proportions of syrup to water may be selected according to the characteristics desired for the particular product to be made, but for ordinary purposes it is found that an excellent drink results when 1 part of syrup is added to 10 parts of water.

The drink of this example may be made by mixing the syrup to the water while cold and thereafter bottling same; or, if desired, the chocolate and water drink mixture may be heated to any desired temperature, such as, for instance, to approximately 145° F. for 30 minutes. Thereupon, the mixture may be cooled and bottled. If a sterile product is wanted, of course, the product may be bottled and heated to sterilizing temperatures.

The drink made in this manner may be carbonated prior to bottling so as to form a chocolate soda water. If carbonating is desired, the proper amount of $CO_2$ gas may be passed into the drink without affecting the suspension of chocolate therein or otherwise impairing the good qualities thereof.

*Example No. 3*

This example relates to the initial production of a powdered product rather than a syrup. Because of the very high solubility of quince seed mucilage, dry powders containing cocoa, sugar, flavoring and quince seed mucilage may be added to milk or water in place of the syrup previously mentioned in connection with Examples Nos. 1 and 2, with the result that essentially the same product is produced. One formula for a powder coming within the scope of this invention may be as follows:

|  | Parts by weight |
|---|---|
| Cocoa | 10 |
| Sugar | 53 |
| Quince seed mucilage | .3 to 1 |

With this powder, the ratio of powder to milk would preferably be 1 part powder to from 10 to 16.3 parts of milk.

This invention, however, is not to be limited by these proportions in view of the wide variations possible with the various ingredients.

This powder may be used with cold milk by adding the powder slowly to the milk under sufficient agitation, permitting the agitation to continue until thorough mixing is obtained and the bottling is completed. If the hot process is used, the powder may be slowly added to milk under agitation, and the mixture heated to practically any desirable temperature—although it is recommended to use 145° F.—for 30 minutes under sufficient agitation. The mixture is then cooled and bottled.

*Example No. 4*

The procedure according to this example may follow the procedure of Example No. 3, with the exception that a modified pasteurization treatment may be employed. It is known that milk drinks, if pasteurized and bottled hot, will have better keeping qualities than when bottled cold. The benefit of this known fact, however, has not been utilizable prior to this invention in the manufacture of chocolate milk drinks for the reason that suspending agents heretofore employed for maintaining the chocolate particles in suspension, when used in the preferred quantity, will not prevent the chocolate particles from settling to the bottom when the product is hot. However, when quince seed extract is employed in accordance with this invention, no settling out occurs even when the product is hot, and, accordingly, it is possible to bottle the beverage at an elevated temperature and gain the additional benefit of improved keeping qualities flowing from this method.

According to this example, a flash pasteurizer may be employed. Such pasteurizers are now known and may be obtained on the market, and in use serve to elevate the temperature of the beverage to the pasteurizing point in a relatively few seconds and hold the same there a very limited time so as to prevent any unwanted changes in the flavor or character of the drink. The beverage may then be bottled while hot, and if sealed the keeping qualities of the drink will be improved.

*Example No. 5*

This fifth example relates to the use of the powder employed in Example No. 3, except that the same is mixed with water instead of milk, in any desired proportion, and either while cold or by the use of heat as may be desired in any particular instance. Furthermore, it is contemplated that this product, made by powder suspended in a medium of water, may be carbonated by the introduction of the proper amount of $CO_2$ gas to accomplish this purpose.

*Example No. 6*

This example relates to the production of a sterilized milk drink employing either dry milk or fluid milk. If fluid milk is used, it may be in the form of fresh, warm milk, or in the form of condensed or evaporated milk according to the convenience in each particular case.

A typical formula for this example may be as follows:

|  | Parts by weight |
|---|---|
| Cocoa | 10 |
| Sugar | 53 |
| Quince seed mucilage | .3 to 1 |
| Milk powder | 36 |

In order to prepare the drink of this invention, place in a mixing tank 62 parts of water, and while it is possible to use water at any temperature, it is found that best results are obtained when the water is first heated to 100° F. before the above described powder is added. Sift the powder slowly into the water. It is found that best results are obtained when a motor agitator is used, as this will keep the powder from lumping in the water and will give a uniform solution in a very short time. One-half hour is usually sufficient time for mixing. A longer period is undesirable because the milk powder in solution will have a tendency to spoil.

When the product is thoroughly mixed, the bottles may be filled by means of a syphon filler or by any other convenient method. It is preferred to use the syphon filler because of the thorough mixing which is obtained by its use. If a pressure filler is used, it is necessary to shake each bottle before it is packed in the sterilizer in order to thoroughly mix the contents of the bottle, or an insoluble, leathery mass may appear in the bottom of the bottle due to improper mixing. Furthermore, if a pressure filler is used, the initial water content of the drink as prepared under the above formula is reduced so as to permit the introduction of additional water at the time the drink it bottled.

After the bottles are filled, they are packed in baskets or crates and placed in a sterilizer. The sterilizer door or lid is closed and the relief valve opened to allow air to escape until a temperature of 210° F. is reached. The valve is then closed and the temperature brought up to 240° F., 15 to 20 minutes being required to bring it to this temperature, which is held for 30 minutes. The relief valve is then opened and the steam exhausted. The door or lid of the sterilizer should be opened very slowly. While the product may be removed from the sterilizer without cooling, it is found best to cool with water to practically room temperature. Since this product may be sterilized in a stationary retort without any settling occurring in the bottles, cooling can only be accomplished by first causing a mixture of steam and water to enter the sterilizer so that the temperature is not much different from that of the inside of the sterilizer and then gradually cut down on the steam and increase the water, so that too sudden a change does not cause bottle breakage. By slowly cooling in this fashion, room temperature may be obtained without breakage of the bottles. If this procedure is followed, when the bottles are removed from the sterilizer they are ready for sale and will not need to be shaken or agitated.

By the procedure constituting the foregoing example, sterile chocolate-flavor milk drinks may be produced in stationary retorts. This is a decided improvement in the processing of materials of this kind, and it is made possible through the fact that the mucilaginous extract from quince seeds which characterizes this invention, exerts substantially the same suspending effect upon the chocolate particles when the chocolate milk product is at 240° F. as when it is at room temperature. Heretofore, rotary retorts or retorts equipped with stirring or agitating mechanism have been necessary to prevent unwanted settling and cooking of the chocolate particles on the bottom of the containers while in the retort. This has been due to the fact that prior to this invention no agent, as far as the applicant is aware, has been available which would satisfactorily hold the chocolate particles in suspension at 240° F. so as to prevent settling out on the bottom during sterilizing treatment, which at the same time would not unduly thicken or solidify the product when at cooled drinking temperature, as when kept in a refrigerator. In other words, one marked improvement which results from the use of this invention is the substantial uniformity of suspending effect at the higher sterilizing temperature as that resulting from the use thereof at lower cooled drinking temperatures, and without producing undue thickening or solidification at the lower temperatures.

It is believed that the agent of this invention is the first to produce this highly desirable result, and consequently, to make possible sterilization treatments without rotation or agitation of the type heretofore employed.

Of course, any other type of retort could be used, if desired, in carrying out the procedure of this example.

*Example No. 7*

This example relates to the production of a sterile product according to the procedure of Example No. 6 with, however, the employment of a slightly modified suspending agent. The suspending agent of this example utilizes in conjunction with the quince seed mucilage, a small percentage of Irish moss, which may be advantageously used with the quince seed mucilage.

A typical formula of this example may be as follows:

| | Parts by weight |
|---|---|
| Cocoa | 10 |
| Sugar | 53 |
| Quince seed mucilage | 0.23 to 0.78 |
| Irish moss extract | 0.08 to 0.24 |
| Milk powder | 36 |

The procedure of mixing will follow that set forth in Example No. 6, with the exception that the Irish moss extract is added to the quince seed mucilage and introduced at the same time.

*Example No. 8*

This example follows the procedure of Examples Nos. 6 and 7, except that the milk powder may be omitted in these formulas and, instead, the requisite quantity of water is added to form a chocolate drink having a base of water instead of milk.

This product may be carbonated if desired, but otherwise it is formed according to the procedure above outlined.

Another important improvement produced by this invention is that the products of the foregoing examples, which are made with water or other liquid medium which contains no milk, may be carbonated to form a carbonated beverage constituting what may be termed "chocolate soda water." This is due to the fact that the mucilaginous extract of this invention is capable of forming a good and stable suspension of chocolate particles in a liquid medium, such as water, and does not depend in any degree upon the presence of constituents of milk.

As above pointed out, the suspension of chocolate particles heretofore in drinks has depended in part upon the presence of constituents of milk, and, in addition thereto, an initial heat treatment in order to obtain the initial suspension. On this account, it has been impossible to subsequently carbonate drinks so produced for the reason that the presence of the requisite amount of $CO_2$ gas would result in a curdling of the milk present in the product. This, of course, would spoil the product and render it unfit for commercial use. Now, however, by the present invention, a stable chocolate drink may be produced by utilizing water or other liquid medium containing no milk, which may subsequently be carbonated according to procedure now in common use for carbonating soft drinks. By this invention, the suspension of chocolate may be accomplished when the product is cold and it may be subsequently carbonated while cold, and then the product may be subjected to heat treatment after bottling to reduce the amount of bacteria or to sterilize the product, as may be desired in any particular case.

From the foregoing disclosure, it is apparent that the applicant has provided a new and improved chocolate-flavor drink which possesses all of the advantages set forth in this specification. The examples herein set forth are given merely by way of example and are not to be considered as limiting the invention in any respect other than as set forth in the appended claims.

This invention is applicable to products and processes which employ either chocolate or cocoa, and consequently the term "chocolate" is used generically in the specification and claims and is intended to include all chocolate-flavor particles whether the same are utilized in the form of chocolate as such (which includes most of its natural cocoa butter) or in the form generally known as "cocoa." Similarly, "cocoa" is used generically and includes chocolate, except insofar as its use in particular instances (as when a powder is required) may necessitate that it be restricted to that form of chocolate-flavor particles which have a reduced quantity of natural cocoa butter therein.

In any of the foregoing examples which involve the use of a syrup, chocolate as such may be substituted for the cocoa specified, and if chocolate is so substituted, its quantity should be adjusted to give the corresponding amount of solid chocolate particles, or, in other words, substantially the same amount of chocolate-flavor producing solids.

The term "aqueous liquid medium" as hereinafter used in the appended claims, is defined to mean water, milk and other aqueous liquids which are suitable for mixing chocolate drinks of the character herein referred to.

The term "milk" hereinafter used in the appended claims is defined to include liquid, dry and other forms of milk such as evaporated or condensed milk.

What is claimed is:

1. A non-settling chocolate-flavor drink, comprising an aqueous liquid medium, chocolate particles, and a mucilaginous extract of quince seeds, said extract being present in proportion sufficient to cause said chocolate particles to remain substantially permanently in suspension under conditions ordinarily encountered in manufacture and use.

2. A non-settling chocolate-flavor drink, comprising water, chocolate prticles, a mucilaginous extract of quince seeds, and carbon dioxide gas held in said water, said mucilaginous extract being present in quantity sufficient to cause said chocolate particles to remain substantially permanently in suspension under conditions ordinarily encountered in manufacture and use.

3. A non-settling chocolate-flavor drink, comprising an aqueous liquid medium, chocolate particles, and a suspending agent comprising a mucilaginous extract of quince seeds and Irish moss, said suspending agent being present in proportion sufficient to cause said chocolate particles to remain substantially permanently in suspension under conditions ordinarily encountered in manufacture and use.

4. A non-settling chocolate-flavor drink, comprising water, chocolate particles, a suspending agent comprising a mucilaginous extract of quince seeds and Irish moss, and carbon dioxide gas held in said water, said suspending agent being present in quantity sufficient to cause said chocolate particles to remain substantially permanently in suspension under conditions ordinarily encountered in manufacture and use.

5. The method of making a non-settling chocolate-flavor drink, which comprises preparing a syrup by mixing cocoa, sugar, quince seed mucilage and water, and subsequently adding said syrup to a quantity of an aqueous liquid.

6. The method of making a non-settling chocolate-flavor drink, which comprises preparing a syrup by mixing cocoa, sugar, quince seed mucilage and water, and subsequently adding said syrup to a quantity of water and then carbonating the product so prepared.

7. The method of making a non-settling chocolate-flavor drink, which comprises preparing a powder by mixing cocoa, sugar and a dried mucilaginous extract of quince seeds, and subsequently adding such powder to an aqueous liquid.

8. The process of making a non-settling chocolate-flavor milk drink, which comprises making a powder by mixing cocoa, sugar, dried mucilaginous extract of quince seeds and milk powder, and subsequently adding the powdered product so produced to water.

9. The process of making a non-settling chocolate-flavor milk drink, which comprises making a powder by mixing cocoa, sugar, dried mucilaginous extract of quince seeds, and Irish moss, and subsequently adding the powdered product so produced to water.

10. The process of making a non-settling chocolate-flavor milk drink, which comprises making a powder by mixing cocoa, sugar, dried mucilaginous extract of quince seeds, Irish moss, and milk powder, and subsequently adding the powdered product so produced to water.

11. The process of producing a sterile non-settling chocolate-flavor milk product, which comprises mixing cocoa, sugar, mucilaginous extract of quince seeds, and milk, sealing the product so obtained in suitable containers, and then subjecting the sealed product to a temperature of substantially 240° F. for approximately thirty minutes.

12. The process of producing a non-settling chocolate-flavor milk drink, which comprises mixing cocoa, sugar, mucilaginous extract of quince seeds and milk powder, thereafter introducing the mixture into a predetermined quantity of water so as to form a uniform solution and suspension thereof, sealing such product in suitable containers, and thereafter subjecting the same to a sterilizing heat treatment.

13. The process of producing a non-settling chocolate-flavor milk drink, which comprises mixing cocoa, sugar, mucilaginous extract of quince seeds, milk powder, and Irish moss, thereafter introducing this mixture into a predetermined quantity of water so as to form a uniform solution and suspension thereof, sealing such product in suitable containers, and thereafter subjecting the same to a sterilizing heat treatment.

14. A chocolate syrup for use in preparing non-settling chocolate-flavor beverages, comprising cocoa, sugar, quince seed mucilage, flavoring material and water.

15. A dry powder for use in preparing non-settling chocolate-flavor beverages, which comprises cocoa, sugar and dried quince seed mucilage.

16. A chocolate syrup for use in producing a non-settling chocolate-flavor beverage, comprising the following ingredients in substantially the proportions specified: cocoa 10 parts, sugar 55 parts, quince seed mucilage from .3 to 1 part, flavoring to taste, and water substantially 34 to 35 parts.

17. A powder adapted for use in making non-settling chocolate-flavor bevarages, which comprises the following ingredients in substantially the proportions specified: 10 parts of cocoa, 55 parts of sugar, and from .3 to 1 part of quince seed extract.

18. The process which comprises heating 55 parts of sugar and 15 parts of water until the solution boils, next invert the sugar by introducing tartaric acid, next cool the solution to substantially 180° F. and stir in approximately 10 parts of cocoa, next add a solution of .3 to 1 part of quince seed mucilage and approximately 20 parts of water while at a temperature of substantially 165° F. and mix well, and finally cool to form a syrup.

19. The method of making a non-settling chocolate-flavor drink, which comprises preparing an aqueous syrup by mixing cocoa, sugar, quince seed mucilage and a liquid, subsequently adding said syrup to a quantity of liquid suspension medium, subjecting the mixture so prepared to flash pasteurization, and finally sealing said product while hot in suitable containers.

20. A non-settling chocolate-flavor drink, including an aqueous liquid medium, chocolate-flavor particles in quantity sufficient to supply the desired chocolate flavor to the drink, and a suspending medium in quantity sufficient to cause said chocolate-flavor particles to remain substantially permanently in suspension in the drink under the conditions ordinarily encountered in use, said suspending medium being characterized as including a substantial portion of a mucilaginous extract of quince seeds, whereby no substantial thickening is obtained.

ARTHUR EDWARD SIEHRS.